(12) United States Patent
Maikhuri et al.

(10) Patent No.: US 12,482,476 B2
(45) Date of Patent: Nov. 25, 2025

(54) ACCENT PERSONALIZATION FOR SPEAKERS AND LISTENERS

(71) Applicant: Dell Products L.P., Round Rock, TX (US)

(72) Inventors: Ajay Maikhuri, Bangalore (IN); Dhilip Kumar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 247 days.

(21) Appl. No.: 18/053,886

(22) Filed: Nov. 9, 2022

(65) Prior Publication Data

US 2024/0161764 A1 May 16, 2024

(51) Int. Cl.
*G10L 21/007* (2013.01)
*G10L 15/22* (2006.01)

(52) U.S. Cl.
CPC ............ *G10L 21/007* (2013.01); *G10L 15/22* (2013.01)

(58) Field of Classification Search
CPC .............................. G10L 21/007; G10L 15/22
See application file for complete search history.

(56) References Cited

U.S. PATENT DOCUMENTS

| | | | |
|---|---|---|---|
| 2018/0174595 A1* | 6/2018 | Dirac | G10L 21/013 |
| 2022/0044688 A1* | 2/2022 | Perret | G10L 17/02 |
| 2022/0358903 A1* | 11/2022 | Serebryakov | G10L 13/033 |
| 2022/0415340 A1* | 12/2022 | Barhate | G10L 21/0364 |
| 2023/0223006 A1* | 7/2023 | Fan | H04M 1/72403 |
| | | | 704/231 |
| 2023/0352001 A1* | 11/2023 | Carmiel | G10L 13/10 |
| 2024/0098218 A1* | 3/2024 | Nguyen | G10L 15/063 |

OTHER PUBLICATIONS

Ding, S. (2021). Few-Shot Voice and Foreign Accent Conversion and Its Applications in Pronunciation Training (Doctoral dissertation).*

Grigoriadis, S. (2019). Convolutional neural networks for accent classification.*

* cited by examiner

*Primary Examiner* — Bryan S Blankenagel
(74) *Attorney, Agent, or Firm* — DALY, CROWLEY, MOFFORD & DURKEE, LLP

(57) ABSTRACT

In one aspect, an example methodology implementing the disclosed techniques includes, by a computing device, receiving audio data corresponding to a spoken utterance by a first user and determining an accent of the audio data. The method also includes, by the computing device, neutralizing the accent of the audio data to a preconfigured accent and transmitting a modified audio data in the preconfigured accent to another computing device. The modified audio data includes the spoken utterance by the first user.

18 Claims, 9 Drawing Sheets

ACCENT PERSONALIZATION FOR SPEAKERS AND LISTENERS

BACKGROUND

Use of virtual meetings have become more widespread and they have grown in popularity. Virtual meetings, such as teleconferences (e.g., only audio), video conferences (e.g., audio and video), and web conferences (e.g., audio, video, and content-sharing), allow users in different locations, even in different countries, to engage and interact. For example, within an organization, virtual meetings have become increasing popular for conferences, business development meetings, sales and marketing, mentoring, and sharing ideas. Common virtual meeting platforms, such as TEAMS, SKYPE, ZOOM, GOTOMEETING, and WEBEX, may provide virtual meeting functionality among other features.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

It is appreciated herein that, despite their many benefits, virtual meetings have some shortcomings when attended by non-native language speakers. First, all the participants in a virtual meeting need to communicate in a common language. For instance, most of the communication in these meetings is done in English. However, although English is the most widely spoken language, it is important to note that the majority of speakers may be non-native English speakers. For instance, data shows that a very high percentage of English speakers speak English as a second language. Research also shows that when a native English speaker and a non-native English speaker enter a conversation, understanding goes down. Understanding may go down even in cases where a conversation is between native English speakers because of the different subcategories of native English, which include North American English, Australian English, British English, Scottish English, and Southern American English, for example. The speaker's accent is very important in human conversation and understanding since comprehension may be lost if the speaker's accent is not understood by the listener. In other words, a listener may not comprehend what is spoken if the speaker's accent is different from their own. Some embodiments of the present disclosure can enhance, among other aspects, communication between non-native and native English speakers by converting non-native English to native English (e.g., neutral English) and then personalizing the native English for non-native English listeners.

In accordance with one illustrative embodiment provided to illustrate the broader concepts, systems, and techniques described herein, a method includes, by a computing device, receiving audio data corresponding to a spoken utterance by a first user and determining an accent of the audio data. The method also includes, by the computing device, neutralizing the accent of the audio data to a preconfigured accent and transmitting a modified audio data in the preconfigured accent to another computing device. The modified audio data includes the spoken utterance by the first user.

In one aspect, the preconfigured accent is a native English accent. In one aspect, the accent of the audio data is a non-native English accent. In another aspect, the accent of the audio data is a native English accent.

In some embodiments, the method also includes, by the another computing device, receiving the modified audio data and personalizing the accent of the modified audio data to an accent of the second user. In one aspect, the accent of the second user is a native English accent. In another aspect, the accent of the second user is a non-native English accent.

In some embodiments, the method also includes, by the another computing device, receiving the modified audio data and personalizing a voice of the spoken utterance in the modified audio data to another voice. In one aspect, the another voice is a voice of the second user. In another aspect, the another voice is a voice specified the second user.

According to another illustrative embodiment provided to illustrate the broader concepts described herein, a system includes one or more non-transitory machine-readable mediums configured to store instructions and one or more processors configured to execute the instructions stored on the one or more non-transitory machine-readable mediums. Execution of the instructions causes the one or more processors to carry out a process corresponding to the aforementioned method or any described embodiment thereof.

According to another illustrative embodiment provided to illustrate the broader concepts described herein, a non-transitory machine-readable medium encodes instructions that when executed by one or more processors cause a process to be carried out, the process corresponding to the aforementioned method or any described embodiment thereof.

It should be appreciated that individual elements of different embodiments described herein may be combined to form other embodiments not specifically set forth above. Various elements, which are described in the context of a single embodiment, may also be provided separately or in any suitable sub-combination. It should also be appreciated that other embodiments not specifically described herein are also within the scope of the claims appended hereto.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

In the following description, certain embodiments and/or examples of the concepts, techniques, and structures are described in the context of English to facilitate understanding. It will be appreciated in light of this disclosure that such embodiments and/or examples are not restricted as such but are applicable to any spoken language.

Figure 1:
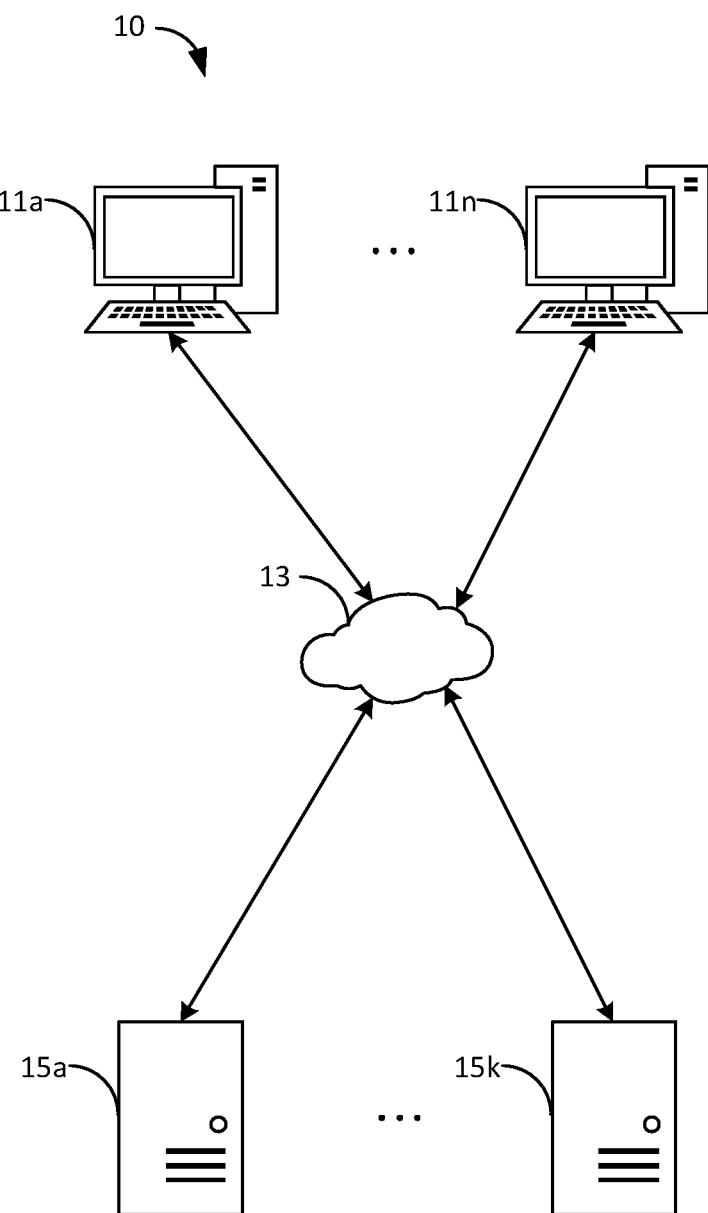
FIG. 1 is a diagram illustrating an example network environment of computing devices in which various aspects of the disclosure may be implemented, in accordance with an embodiment of the present disclosure.

Referring now to FIG. 1, shown is a diagram illustrating an example network environment 10 of computing devices in which various aspects of the disclosure may be implemented, in accordance with an embodiment of the present disclosure. As shown, environment 10 includes one or more client machines 11a-11n (11 generally), one or more server machines 15a-15k (15 generally), and one or more networks 13. Client machines 11 can communicate with server machines 15 via networks 13. Generally, in accordance with client-server principles, a client machine 11 requests, via network 13, that a server machine 15 perform a computation or other function, and server machine 15 responsively fulfills the request, optionally returning a result or status indicator in a response to client machine 11 via network 13.

In some embodiments, client machines 11 can communicate with remote machines 15 via one or more intermediary appliances (not shown). The intermediary appliances may be positioned within network 13 or between networks 13. An intermediary appliance may be referred to as a network interface or gateway. In some implementations, the intermediary appliance may operate as an application delivery controller (ADC) in a datacenter to provide client machines (e.g., client machines 11) with access to business applications and other data deployed in the datacenter. The intermediary appliance may provide client machines with access to applications and other data deployed in a cloud computing environment, or delivered as Software as a Service (SaaS) across a range of client devices, and/or provide other functionality such as load balancing, etc.

Client machines 11 may be generally referred to as computing devices 11, client devices 11, client computers 11, clients 11, client nodes 11, endpoints 11, or endpoint nodes 11. Client machines 11 can include, for example, desktop computing devices, laptop computing devices, tablet computing devices, mobile computing devices, workstations, and/or hand-held computing devices. Server machines 15 may also be generally referred to a server farm 15. In some embodiments, a client machine 11 may have the capacity to function as both a client seeking access to resources provided by server machine 15 and as a server machine 15 providing access to hosted resources for other client machines 11.

Server machine 15 may be any server type such as, for example, a file server, an application server, a web server, a proxy server, a virtualization server, a deployment server, a Secure Sockets Layer Virtual Private Network (SSL VPN) server; an active directory server; a cloud server; or a server executing an application acceleration program that provides firewall functionality, application functionality, or load balancing functionality. Server machine 15 may execute, operate, or otherwise provide one or more applications. Non-limiting examples of applications that can be provided include software, a program, executable instructions, a virtual machine, a hypervisor, a web browser, a web-based client, a client-server application, a thin-client, a streaming application, a communication application, or any other set of executable instructions.

In some embodiments, server machine 15 may execute a virtual machine providing, to a user of client machine 11, access to a computing environment. In such embodiments, client machine 11 may be a virtual machine. The virtual machine may be managed by, for example, a hypervisor, a virtual machine manager (VMM), or any other hardware virtualization technique implemented within server machine 15.

Networks 13 may be configured in any combination of wired and wireless networks. Network 13 can be one or more of a local-area network (LAN), a wide area network (WAN), a metropolitan area network (MAN), a virtual private network (VPN), a primary public network, a primary private network, the Internet, or any other type of data network. In some embodiments, at least a portion of the functionality associated with network 13 can be provided by a cellular data network and/or mobile communication network to facilitate communication among mobile devices. For short range communications within a wireless local-area network (WLAN), the protocols may include 802.11, Bluetooth, and Near Field Communication (NFC).

Figure 2:
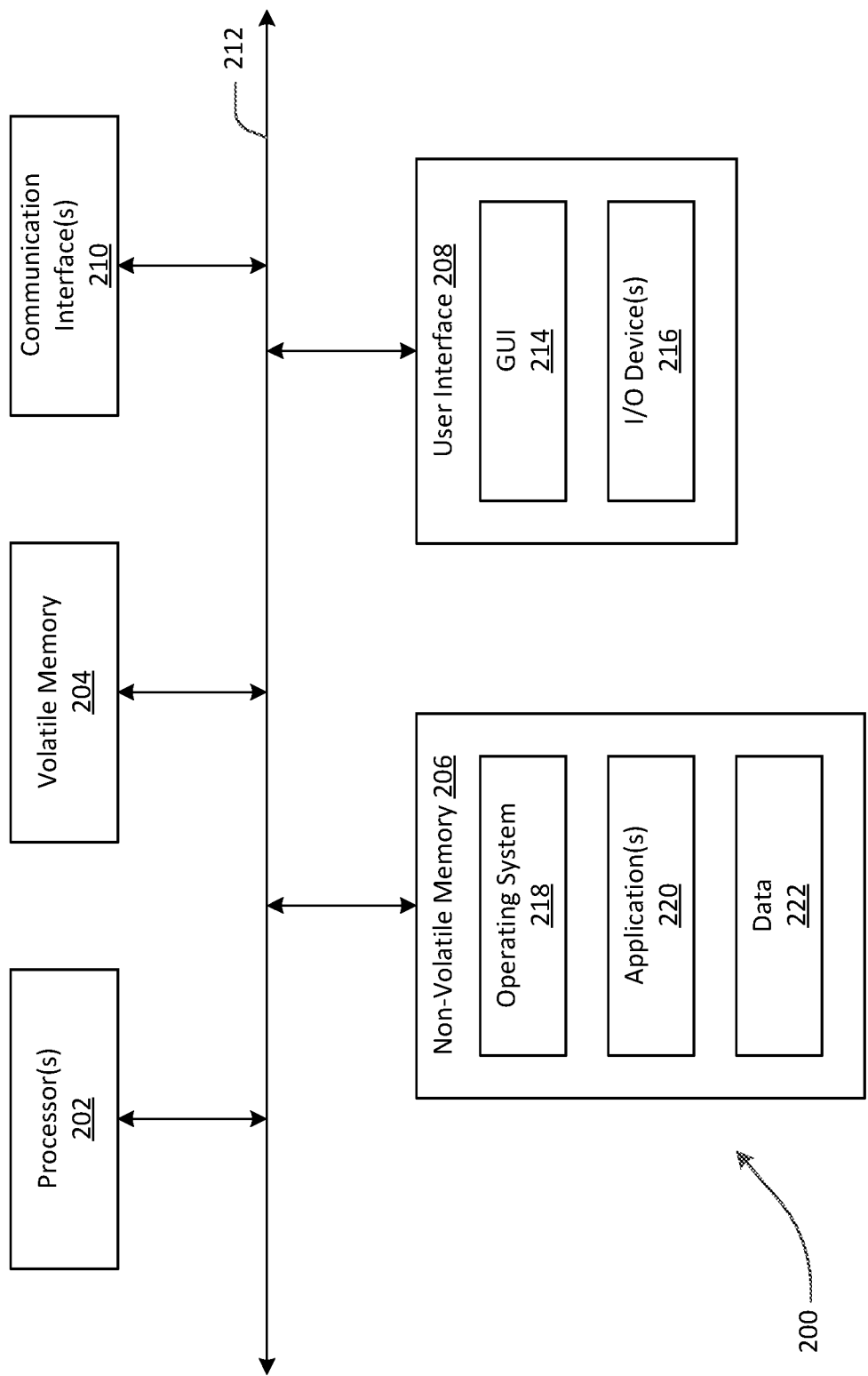
FIG. 2 is a block diagram illustrating selective components of an example computing device in which various aspects of the disclosure may be implemented, in accordance with an embodiment of the present disclosure.

FIG. 2 is a block diagram illustrating selective components of an example computing device 200 in which various aspects of the disclosure may be implemented, in accordance with an embodiment of the present disclosure. For instance, client machines 11 and/or server machines 15 of FIG. 1 can be substantially similar to computing device 200. As shown, computing device 200 includes one or more processors 202, a volatile memory 204 (e.g., random access memory (RAM)), a non-volatile memory 206, a user interface (UI) 208, one or more communications interfaces 210, and a communications bus 212.

Non-volatile memory 206 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

User interface 208 may include a graphical user interface (GUI) 214 (e.g., a touchscreen, a display, etc.) and one or more input/output (I/O) devices 216 (e.g., a mouse, a keyboard, a microphone, one or more speakers, one or more cameras, one or more biometric scanners, one or more environmental sensors, and one or more accelerometers, etc.).

Non-volatile memory 206 stores an operating system 218, one or more applications 220, and data 222 such that, for example, computer instructions of operating system 218 and/or applications 220 are executed by processor(s) 202 out of volatile memory 204. In one example, computer instructions of operating system 218 and/or applications 220 are executed by processor(s) 202 out of volatile memory 204 to perform all or part of the processes described herein (e.g., processes illustrated and described with reference to FIGS. 4 through 9). In some embodiments, volatile memory 204 may include one or more types of RAM and/or a cache memory that may offer a faster response time than a main memory. Data may be entered using an input device of GUI 214 or received from I/O device(s) 216. Various elements of computing device 200 may communicate via communications bus 212.

The illustrated computing device 200 is shown merely as an illustrative client device or server and may be implemented by any computing or processing environment with any type of machine or set of machines that may have suitable hardware and/or software capable of operating as described herein.

Processor(s) 202 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

Processor 202 may be analog, digital or mixed signal. In some embodiments, processor 202 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communications interfaces 210 may include one or more interfaces to enable computing device 200 to access a computer network such as a Local Area Network (LAN), a Wide Area Network (WAN), a Personal Area Network (PAN), or the Internet through a variety of wired and/or wireless connections, including cellular connections.

In described embodiments, computing device 200 may execute an application on behalf of a user of a client device. For example, computing device 200 may execute one or more virtual machines managed by a hypervisor. Each virtual machine may provide an execution session within which applications execute on behalf of a user or a client device, such as a hosted desktop session. Computing device 200 may also execute a terminal services session to provide a hosted desktop environment. Computing device 200 may provide access to a remote computing environment including one or more applications, one or more desktop applications, and one or more desktop sessions in which one or more applications may execute.

Figure 3:
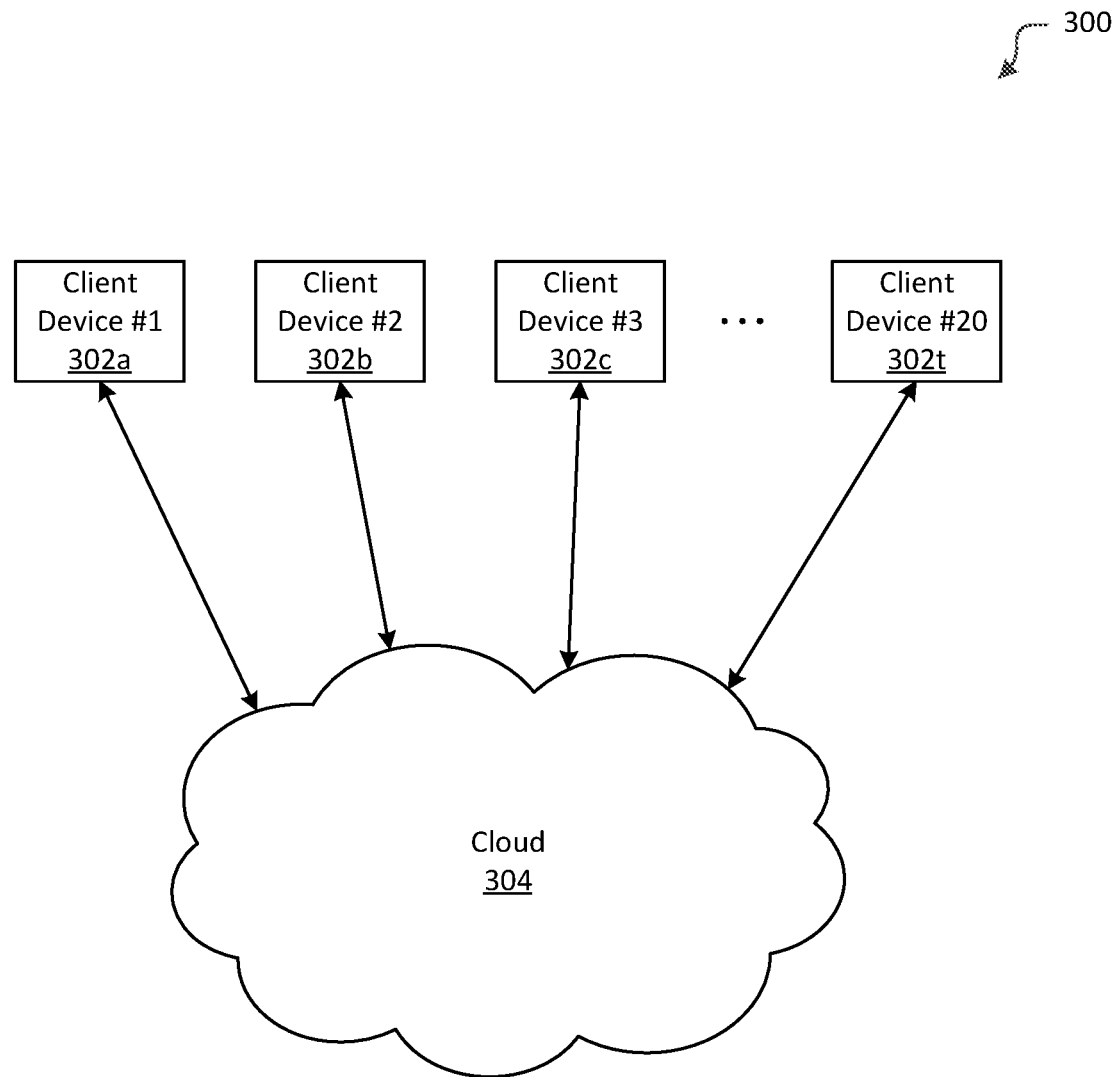
FIG. 3 is a diagram of a cloud computing environment in which various aspects of the concepts described herein may be implemented.

Referring to FIG. 3, shown is a diagram of a cloud computing environment 300 in which various aspects of the concepts described herein may be implemented. Cloud computing environment 300, which may also be referred to as a cloud environment, cloud computing, or cloud network, can provide the delivery of shared computing resources and/or services to one or more users or tenants. For example, the shared resources and services can include, but are not limited to, networks, network bandwidth, servers, processing, memory, storage, applications, virtual machines, databases, software, hardware, analytics, and intelligence.

In cloud computing environment 300, one or more client devices 302a-302t (such as client machines 11 and/or computing device 200 described above) may be in communication with a cloud network 304 (sometimes referred to herein more simply as a cloud 304). Cloud 304 may include back-end platforms such as, for example, servers, storage, server farms, or data centers. The users of clients 302a-302t can correspond to a single organization/tenant or multiple organizations/tenants. More particularly, in one implementation, cloud computing environment 300 may provide a private cloud serving a single organization (e.g., enterprise cloud). In other implementations, cloud computing environment 300 may provide a community or public cloud serving one or more organizations/tenants.

In some embodiments, one or more gateway appliances and/or services may be utilized to provide access to cloud computing resources and virtual sessions. For example, a gateway, implemented in hardware and/or software, may be deployed (e.g., reside) on-premises or on public clouds to provide users with secure access and single sign-on to virtual, SaaS, and web applications. As another example, a secure gateway may be deployed to protect users from web threats.

In some embodiments, cloud computing environment 300 may provide a hybrid cloud that is a combination of a public cloud and a private cloud. Public clouds may include public servers that are maintained by third parties to client devices 302a-302t or the enterprise/tenant. The servers may be located off-site in remote geographical locations or otherwise.

Cloud computing environment 300 can provide resource pooling to serve clients devices 302a-302t (e.g., users of client devices 302a-302n) through a multi-tenant environment or multi-tenant model with different physical and virtual resources dynamically assigned and reassigned responsive to different demands within the respective environment. The multi-tenant environment can include a system or architecture that can provide a single instance of software, an application, or a software application to serve multiple users. In some embodiments, cloud computing environment 300 can include or provide monitoring services to monitor, control, and/or generate reports corresponding to the provided shared resources and/or services.

In some embodiments, cloud computing environment 300 may provide cloud-based delivery of various types of cloud computing services, such as Software as a service (SaaS), Platform as a Service (PaaS), Infrastructure as a Service (IaaS), and/or Desktop as a Service (DaaS), for example. IaaS may refer to a user renting the use of infrastructure resources that are needed during a specified time period. IaaS providers may offer storage, networking, servers, or virtualization resources from large pools, allowing the users to quickly scale up by accessing more resources as needed. PaaS providers may offer functionality provided by IaaS, including, e.g., storage, networking, servers, or virtualization, as well as additional resources such as, for example, operating systems, middleware, and/or runtime resources. SaaS providers may offer the resources that PaaS provides, including storage, networking, servers, virtualization, operating systems, middleware, or runtime resources. SaaS providers may also offer additional resources such as, for example, data and application resources. DaaS (also known as hosted desktop services) is a form of virtual desktop service in which virtual desktop sessions are typically delivered as a cloud service along with the applications used on the virtual desktop.

Figure 4:
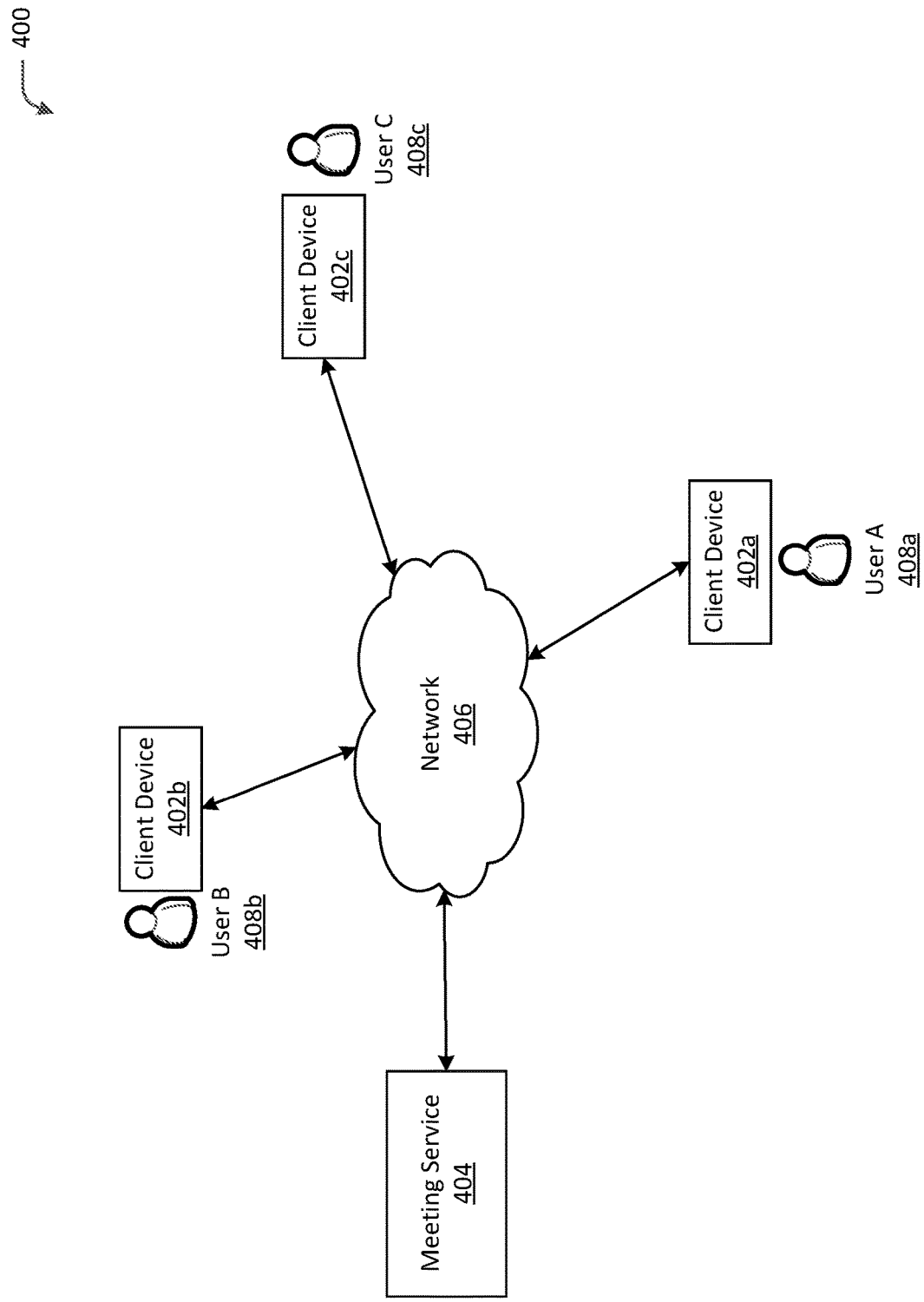
FIG. 4 is a diagram of an illustrative network environment in which accent personalization may be implemented, in accordance with an embodiment of the present disclosure.

FIG. 4 is a diagram of an illustrative network environment 400 in which accent personalization may be implemented, in accordance with an embodiment of the present disclosure. As shown, illustrative network environment 400 includes client devices 402a, 402b, 402c (402 generally) and an online meeting service (or "meeting service") 404. Client devices 402 may be configured to communicate with meeting service 404 via one or more computer networks 406 (e.g., via the Internet). Meeting service 404 may be provided as part of a cloud computing environment (e.g., cloud computing environment 300 of FIG. 3).

Client devices 402a, 402b, 402c may be used by or otherwise associated with users 408a, 408b, 408c (408 generally), respectively. Users 408 may correspond to participants in an online meeting (sometimes referred to herein more simply as a "meeting") hosted by online meeting service 404. Client devices 402 can include, for example, desktop computing devices, laptop computing devices, tablet computing devices, and/or mobile computing devices. Client devices 402 can be configured to run one or more applications, such as desktop applications, mobile applications, and SaaS applications. Among various other types of applications, client devices 402 can run an online meeting application (sometimes referred to herein more simply as a "meeting application") that provides audio communication (or "speech communication") among other features. For example, client devices 402 can run TEAMS, SKYPE, ZOOM, GOTOMEETING, WEBEX, or another meeting application. The meeting application running on client devices 402 can communicate with meeting service 404 and/or with the meeting application running on other client devices 402 (e.g., using peer-to-peer communication). In some embodiments, a client device 402 may be the same or substantially similar to client 11 described above in the context of FIG. 1 and/or computing device 200 described above in the context of FIG. 2. While only three client devices 402 and three corresponding users 408a, 408b, 408c are shown in FIG. 4, the structures and techniques sought to be protected herein can be applied to any number of users and devices.

In the example of FIG. 4, users 408 may use respective client devices 402 to participate in an online meeting with one another. User 408a may be a non-native English speaker who speaks English with an Indian accent, user 408b may be a native English speaker who speaks English with an American accent, and user 408c may be a non-native English speaker who speaks English with a Chinese accent. During the meeting, the meeting application on client device 402a may provide audio data captured by a microphone connected to or otherwise associated with client device 402a. The audio data may correspond to a spoken utterance (e.g., speech or sounds) made by user 408a in the Indian accent of user 408a. Client device 402a may transmit or otherwise send the audio data to meeting service 404 via network 406. In some embodiments, client device 402a may also send an indicator or other data that indicates to meeting service 404 an accent of the speaker, e.g., user 408a, of the spoken utterance in the audio data (e.g., an accent of the spoken utterance).

Meeting service 404 may provide collaboration and communication functionality, such as speech communication, to enable online meetings to occur between meeting participants at various locations. In addition to functionality provided by existing collaboration services/applications, in response to receiving the audio data from client device 402a, meeting service 404 can determine an accent of the audio data. That is, meeting service can determine the accent of the spoken utterance (or more simply "utterance") in (e.g., encoded by) the audio data. For example, a user's speech may be associated with certain characteristics (or "vocal characteristics") which are indicative of an accent. In some embodiments, meeting service 404 can analyze the audio data received from client device 402a to determine the unique characteristics of the audio data, and then compare the determined unique characteristics of the audio data to characteristics of known accents (e.g., a speech accent corpus) to determine the accent of the audio data. In other embodiments, meeting service 404 may receive from client device 402a an indication of the accent of the audio data. For instance, in the example of FIG. 4, meeting service 404 can analyze the audio data and determine that the spoken utterance in the audio data from client device 408a is in the Indian accent. Upon determining the accent of the audio data, meeting service 404 can modify the audio data or generate another audio data in which the detected accent (e.g., Indian accent) is neutralized to a native English accent, such as an American accent, or another preconfigured accent. That is, the detected accent of the audio data is removed and replaced by the native English accent. The preconfigured accent may be configurable by an organization (e.g., the organization providing meeting service 404). Meeting service 404 can then transmit the modified audio data (or a processed version thereof) in the native English accent to the other client devices 402b, 402c.

In response to receiving the modified audio data, client device 402b can determine an accent of user 408b and personalize the accent (e.g., the native English accent) of the modified audio data to the accent of user 408b (e.g., American accent). That is, client device 402b can determine an accent of a listener of the utterance in the modified audio data, e.g., user 408b, and personalize the accent of the modified audio data to the accent of the listener. Client device 402b may determine an accent for user 408b based on settings and information in a user profile associated with user 408b. For example, the user profile may include information indicative of the accent spoken by user 408b. As another example, the user profile may include information indicative of the geographic location of client device 402b and/or user 408b. Client device 402b may determine the accent from the geographic location since users located at different geographic locations (e.g., countries, continents, regions within a country/continent, etc.) tend to speak with different accents. Client device 402b can then modify the audio data (i.e., the modified audio data from meeting service 404) or generate another audio data in which the native English accent is replaced with the accent of user 408b. In this way, the accent of the modified audio data is personalized to that of user 408b. For instance, in the example of FIG. 4, client device 402b can personalize the accent by replacing the native English accent with an American accent. In some embodiments, client device 402b can determine that the native English accent of the modified audio data received from meeting service 404 and the American accent of user 408b are the same (or equivalent) accents, and not modify the received modified audio data (e.g., not change the accent of the modified audio data). The meeting application on client device 402b may then output the audio data personalized with the accent of user 408b via a loudspeaker connected to or otherwise associated with client device 402b. As a result, the listener, e.g., user 408b, can hear the utterance spoken by user 408a in the native accent of the listener (e.g., hear the utterance in the American accent).

Similarly, in response to receiving the modified audio data, client device 402c can determine an accent of user 408c and personalize the accent (e.g., the native English accent) of the modified audio data to the accent of user 408c (e.g., Chinese accent). That is, client device 402c can determine an accent of a listener of the utterance in the modified audio data, e.g., user 408c, and personalize the accent of the modified audio data to the accent of the listener. In a manner described above with respect to client device 402b, client device 402c may determine an accent for user 408c based on settings and information in a user profile associated with user 408c. Client device 402c can then modify the audio data (i.e., the modified audio data from meeting service 404) or generate another audio data in which the native English accent is replaced with the accent of user 408c. In this way, the accent of the modified audio data is personalized to that of user 408c. For instance, in the example of FIG. 4, client device 402c can personalize the accent by replacing the native English accent with a Chinese accent. The meeting application on client device 402c may then output the audio data personalized with the accent of user 408c via a loudspeaker connected to or otherwise associated with client device 402c. As a result, the listener, e.g., user 408c, can hear the utterance spoken by user 408a in the native accent of the listener (e.g., hear the utterance in the Chinese accent).

In some embodiments, client device 402 can personalize the voice of the utterance in the audio data to a voice of a user of client device 402 (e.g., user 408) or another voice specified by the user. For example, in response to receiving the modified audio data, client device 402b can personalize the voice of the utterance of the modified audio data to the voice of user 408b or another voice specified by user 408b. Client device 402b can then output the utterance of the modified audio data in the voice of user 408b or another voice specified by user 408b. Similarly, in response to receiving the modified audio data, client device 402c can personalize the voice of the utterance of the modified audio data to the voice of user 408c or another voice specified by user 408c. Client device 402c can then output the utterance of the modified audio data in the voice of user 408c or another voice specified by user 408c. Outputting the spoken utterance of the modified audio data in this way allows the listener using the client device to hear the spoken utterance in the same voice as the listener or another voice chosen by the listener.

Figure 5:
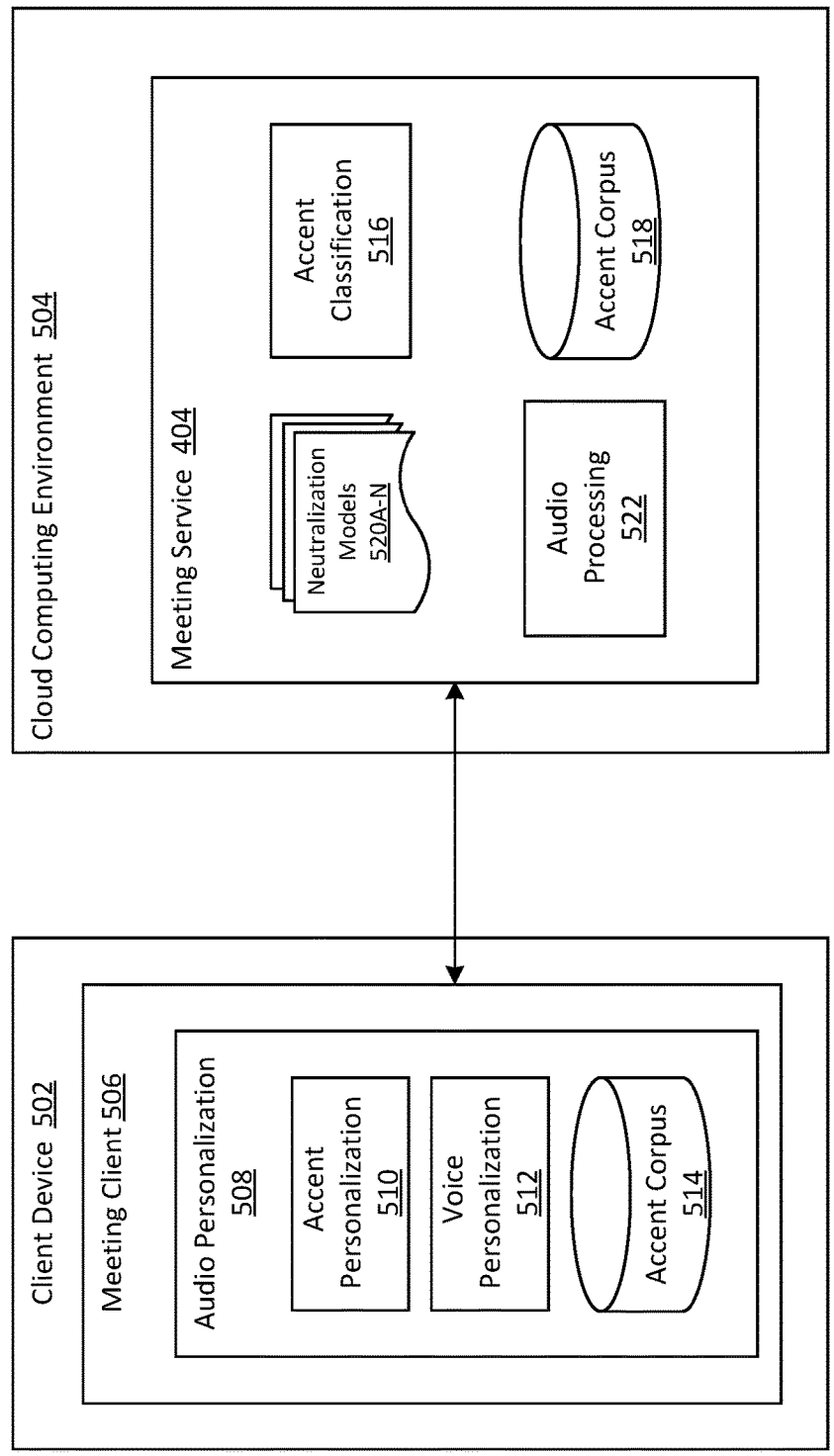
FIG. 5 is a block diagram of a system for accent personalization, in accordance with an embodiment of the present disclosure.

Turning to FIG. 5 and with continued reference to FIG. 4, shown is a block diagram of an illustrative system 500 for accent personalization, in accordance with an embodiment of the present disclosure. Illustrative system 500 includes a client device 502 communicably coupled to online meeting service 404 provided within a cloud computing environment 504. Client device 502 can correspond to any or all of client devices 402 of FIG. 4. Cloud computing environment 504 can be the same or similar to cloud computing environment 300 of FIG. 3.

Illustrative client device 502 can include an online meeting application (or "meeting application") 506 among various other applications. Meeting application 506 may correspond to TEAMS, SKYPE, ZOOM, GOTOMEETING, WEBEX, or another application that can provide audio communication among other features, such as a virtual meeting or virtual conferencing application. Meeting application 506 may connect to meeting service 404 via one or more computer networks (e.g., network 406) to allow a user (e.g., user 408) to participate in online meetings hosted thereby.

As shown in FIG. 5, meeting service 404 can be provided as a service (e.g., a microservice) within cloud computing environment 504. An audio personalization module 508 can be provided as a module or other component of meeting client 506. Audio personalization module 508 and meeting service 404 can interoperate to provide accent personalization to a user of meeting client 506, as variously disclosed herein. To promote clarity in the drawings, FIG. 5 shows a single meeting application 506 communicably coupled to meeting service 404. However, embodiments of meeting service 404 can be used to service many meeting applications 506 used by many different users associated with one or more organizations. Audio personalization module 508 and/or meeting service 404 may be implemented as computer instructions executable to perform the corresponding functions disclosed herein. In the example of FIG. 5, audio personalization module 508 includes an accent personalization submodule 510, a voice personalization submodule 512, and an accent corpus 514. Also, in this example, meeting service 404 includes an accent classification module 516, an accent corpus 518, neutralization models 520A-N, and an audio processing module 522.

The client-side meeting application 506 can communicate with cloud-side meeting service 404 using an API. For example, meeting application 506 can send API requests (or "messages") or other communications to meeting service 404 wherein the messages/communications are received and processed by meeting service 404 or a component of meeting service 404. Likewise, meeting service 404 or a component of meeting service 404 can send API messages/communications (e.g., responses) to meeting application 506 wherein the messages/communications are received and processed by meeting application 506 or a component of meeting application 506.

Referring to cloud-side meeting service 504, accent classifier module 516 is operable to determine an accent of a spoken utterance in audio data. As described above, during a meeting hosted by meeting service 404, client device 502 and, in particular, meeting client 506 on client device 502 that is being used to participate in the meeting, may send audio data corresponding to a spoken utterance made by a user of client device 502 to meeting service 404. Accent classifier module 516 can analyze the audio data from client device 502 to determine an accent of the utterance in the audio data. For example, accent classifier module 516 can analyze the audio data to determine the unique characteristics, such as, for example, voice quality, phoneme pronunciation, prosody, and other phonological characteristics, of the audio data. Accent classifier module 516 can then compare the determined unique characteristics of the audio data to characteristics of known accents (e.g., accent corpus 518) to determine the accent of the audio data.

In some embodiments, accent classifier module 516 can utilize machine learning (ML) models to process the audio data and make determinations or classifications based on the features determined therefrom. For example, in some implementations, accent classifier module 516 can utilize a convolutional neural network (CNN) composed of a convolution layer, a pooling layer, and a softmax layer. The convolution layer in conjunction with the pooling layer are configured to perform feature extraction and the softmax layer is configured to perform classification. In more detail, the convolution layer receives as input the whole audio signal corresponding to the audio data (e.g., audio signal representation of the entire the audio data). Within the convolution layer, multiple filters of varying sizes (i.e., different sizes) can be learned at the same time. As a result, audio signal features at multiple resolutions can be captured. The pooling layer is configured to perform maximum pooling (e.g., 1-max pooling) rather than subsampling. As a result, the most prominent accent feature can be chosen from the feature map produced by convolving one of the filters on an input signal. The prominent features produced by the multiple filters (e.g., the prominent features produced by all filters in the CNN) can be concatenated and input to the softmax layer for classification (e.g., classification of the accent of the audio signal). The CNN and other processing that can be implemented within accent classifier module 520 is further described below at least with respect to FIG. 6.

Neutralization models 520A-N (520 generally) are operable to neutralize an accent of an utterance in audio data. In some embodiments, neutralization models 520 can neutralize an accent of an utterance in the audio data to a native English accent, such as an American accent, or another preconfigured accent. This can be accomplished, for example, by extracting and transforming the para-linguistic and non-linguistic features of a source accent (e.g., a non-native English accent or a native English accent) into those of a target accent (e.g., a native English accent) while preserving the linguistic features. In some embodiments, neutralization models 520 can correspond to ML models (e.g., artificial neural networks (ANNs)) trained/configured to neutralize different accents to the native English accent. For example, neutralization model 520A can be trained/configured to modify (or "convert") an Indian accent (i.e., English spoken with an Indian accent) to the native English accent, neutralization model 520B can be trained/configured to modify a Chinese accent (i.e., English spoken with a Chinese accent) to the native English accent, neutralization model 520C can be trained/configured to modify a Korean accent (i.e., English spoken with a Korean accent) to the native English accent, neutralization model 520D can be trained/configured to modify an Irish accent (i.e., English spoken with an Irish accent) to the native English accent, neutralization model 520E can be trained/configured to modify an Italian accent (i.e., English spoken with an Italian accent) to the native English accent, and so on.

The individual neutralization models 520 can be trained/configured with an accent corpus (e.g., accent corpus 518) composed of training samples of utterances spoken by non-native English speakers and native English speakers. Each training sample in in accent corpus 518 may be an utterance in a non-native English accent and the same utterance in a native English accent. Pairing the non-native English accent and the native English accent of the same utterance in each training sample allows for readily modeling of the differences in the accents. The individual trained neutralization models 520 can, in response to input of audio data, convert the accent of the audio data to the native English accent. In some embodiments, the individual neutralization models 520 can output modified audio data which is in the native English accent. For instance, continuing the example above, neutralization model 520A can, in response to input of audio data which is in an Indian accent (e.g., classified to be in the Indian accent), convert the Indian accent of the audio data to the native English accent, and output modified audio data (e.g., a modified version of the input audio data) which is in the native English accent. Similarly, neutralization model 520B can, in response to input of audio data which is in a Chinese accent (e.g., classified to be in the Chinese accent), convert the Chinese accent of the audio data to the native English accent, and output modified audio data (e.g., a modified version of the input audio data) which is in the native English accent. Generally, the individual neutralization models 520 can perform the conversion of the accent to the native English accent based on the learned differences in the accents in the training samples.

Audio processing module 522 is operable to send modified audio data (e.g., audio data in the native English accent) to client devices which are being used to participate in meetings hosted by meeting service 404. For example, as described above, during a meeting hosted by meeting service 404, client device 502 that is being used to participate in the meeting, may send audio data corresponding to a spoken utterance made by a user of client device 502 to meeting service 404. Upon neutralization of the accent of the audio data by application of an appropriate neutralization model 520, audio processing module 522 can send a modified audio data which is in the native English accent to the other client devices being used to participate in the meeting (e.g., the client devices associated with the other participants in the meeting).

In some embodiments, audio processing module 522 can send audio data received by meeting service 404 to accent classification module 516 for accent classification. In some embodiment, audio processing module 522 can, once audio data is classified by accent classification module 516, apply an appropriate neutralization model 520 to neutralize the accent of the audio data. For example, in response to accent classification module 516 classifying an accent of the audio data to be Chinese, audio processing module 522 can apply neutralization model 520 trained/configured to convert a Chinese accent to the native English accent to the audio data to neutralize the Chinese accent of the audio data.

In some embodiments, some or all the processing described herein for meeting service 404 can be implemented within meeting client 506. For example, accent classification module 516 and/or one or more of the neutralization models 520A-N can be implemented as submodules of meeting client 506 and configured to execute on client 502 (rather than within cloud computing environment 504).

Referring to the client-side audio personalization module 512, accent personalization submodule 510 is operable to personalize an accent of an utterance in audio data to an accent of a user. In this case, the user is a user of a client device on which accent personalization submodule 510 is running. For example, a user can use meeting client 506 running on client device 502 to participate in a meeting hosted by meeting service 404. During the meeting, meeting service 404 may send audio data to client device 502. The audio data may correspond to a spoken utterance made by another user (e.g., another participant) in the meeting. As described above, in some embodiments, the audio data sent by meeting service 404 can be a modified audio data in which the accent of the utterance in the audio data is neutralized to a native English accent. In response to receiving the audio data from meeting service 404, accent personalization submodule 510 can personalize the native English accent of the audio data to the accent of the user using client device 502 to participate in the meeting. In some implementations, accent personalization submodule 510 can determine the accent of the user based on settings and information in a user profile associated with the user.

In some embodiments, accent personalization submodule 510 can utilize ML models (e.g., CNN) to process audio data to personalize the native English accent of audio data to a different accent (e.g., an accent of a user). The ML models can be trained/configured with an accent corpus (e.g., accent corpus 514). Similar to accent corpus 518, accent corpus 514 may be composed of training samples of utterances spoken by native English speakers and non-native English speakers. Each training sample in in accent corpus 514 may be an utterance in a native English accent and the same utterance in a non-native English accent. Pairing the native English accent and the non-native English accent of the same utterance in each training sample allows for readily modeling of the differences in the accents. Once trained, the trained ML model can, in response to input of audio data, convert the native English accent of the audio data to a non-native English accent, such as an Indian accent, an American accent, a Chinese accent, a British accent, or a Japanese accent, to provide a few examples.

In some implementations, accent personalization submodule 510 can utilize a deconvolutional neural network (DNN) composed of deconvolution and unpooling layers (e.g., two unpooling layers). The unpooling layers perform the opposite operation performed by corresponding pooling layers. For instance, the unpooling layers can upsample an input feature map based on pooling masks of corresponding pooling layers (e.g., pooling masks of the pooling layers in the CNN of accent classifier module 516). The deconvolution layer reverses the process of a corresponding convolution layer (i.e., the deconvolution layer deconvolutes an output of a corresponding convolution layer). For instance, the deconvolution layer can convolve the input unpooled features using convolutional weights tied with the corresponding convolution layer's convolution operation (e.g., the convolutional weights tied with the convolution layer in the CNN of accent classifier module 516). The output of the DNN is a restored audio signal (e.g., an audio signal corresponding to audio data in a particular accent for which the DNN is trained/configured). The DNN and other processing that can be implemented within accent personalization submodule 510 is further described below at least with respect to FIG. 7.

Voice personalization submodule 514 is operable to personalize a voice of an utterance in audio data to a voice of a user or another voice specified by the user. In this case, the user is a user of a client device on which voice personalization submodule 514 is running. As described above, a user can use meeting client 506 running on client device 502 to participate in a meeting hosted by meeting service 404. During the meeting, meeting service 404 may send audio data to client device 502. The audio data may correspond to a spoken utterance made by another user (e.g., another participant) in the meeting. The utterance in the audio data may be in the voice of the other user (e.g., the other participant). In response to receiving the audio data from meeting service 404, voice personalization submodule 514 can personalize the voice of the utterance in the audio data to the voice of the user using client device 502 to participate in the meeting. In other embodiments, voice personalization submodule 514 can personalize the voice of the utterance in the audio data to another voice specified by the user using client device 502. For example, meeting client 506 on client device 502 can include various UI elements/controls (e.g., text boxes) via which the user can enter or otherwise specify a desired voice. In response to the user specifying a desired voice, voice personalization submodule 514 can personalize the voice of the utterance in the audio data to the voice specified by the user.

In some embodiments, voice personalization submodule 514 can utilize ML models (e.g., neural networks) to process audio data to personalize the voice of an utterance in audio data to a different voice (e.g., a voice of a user of the client device on which voice personalization submodule 514 is running). In some implementations, voice personalization submodule 514 can utilize an ML model composed of three independently models, a speaker encoder, an accent personalization module, and a vocoder. In some embodiments, the accent personalization module may be the same or substantially similar to accent personalization submodule 510 described above. The speaker encoder, accent personalization module, and vocoder can be independently trained on short segments (e.g., a few seconds) of reference speech (e.g., short segments of speech made by the user). The speaker encoder receives as input the character sequence from the accent personalization module and a speaker embedding vector from audio samples of the speaker, and outputs the mel-spectrogram. The vocoder, such as the universal SC-WaveRNN vocoder, conditioned on the speaker encoder output, can transform the mel-spectrogram into audio waveforms. The ML model and other processing that can be implemented within voice personalization submodule 514 is further described below at least with respect to FIG. 8.

As shown in FIG. 5, audio personalization module 508 may be provided as part of meeting client 506. For example, audio personalization module 508 may be provided as library or as a plugin/extension of meeting client 506. In other embodiments, audio personalization module 508 may be provided as a standalone application or service that interfaces with meeting client 506 to perform the attributed functionality described herein. For example, audio personalization module 508 may send/receive data (e.g., audio data) to/from meeting client 506 using inter-process communication (IPC) and/or by operating on files (e.g., audio files). In still other embodiments, the disclosed structure and/or functionality of audio personalization module 508 may be implemented in whole or in part on a server device. For example, the structure/functionality of audio personalization module 508 may be implemented as part of an online meeting service (e.g., meeting service 404) and/or within a cloud network (e.g., within cloud network 304 of FIG. 3). In more detail, client device 502 may transmit audio data received from meeting service 404 to a server device and the server device may perform the operations of submodules 510 and/or 512 and/or accent corpus 514 to provide a modified audio data that is personalized for the user of client device 502.

Figure 6:
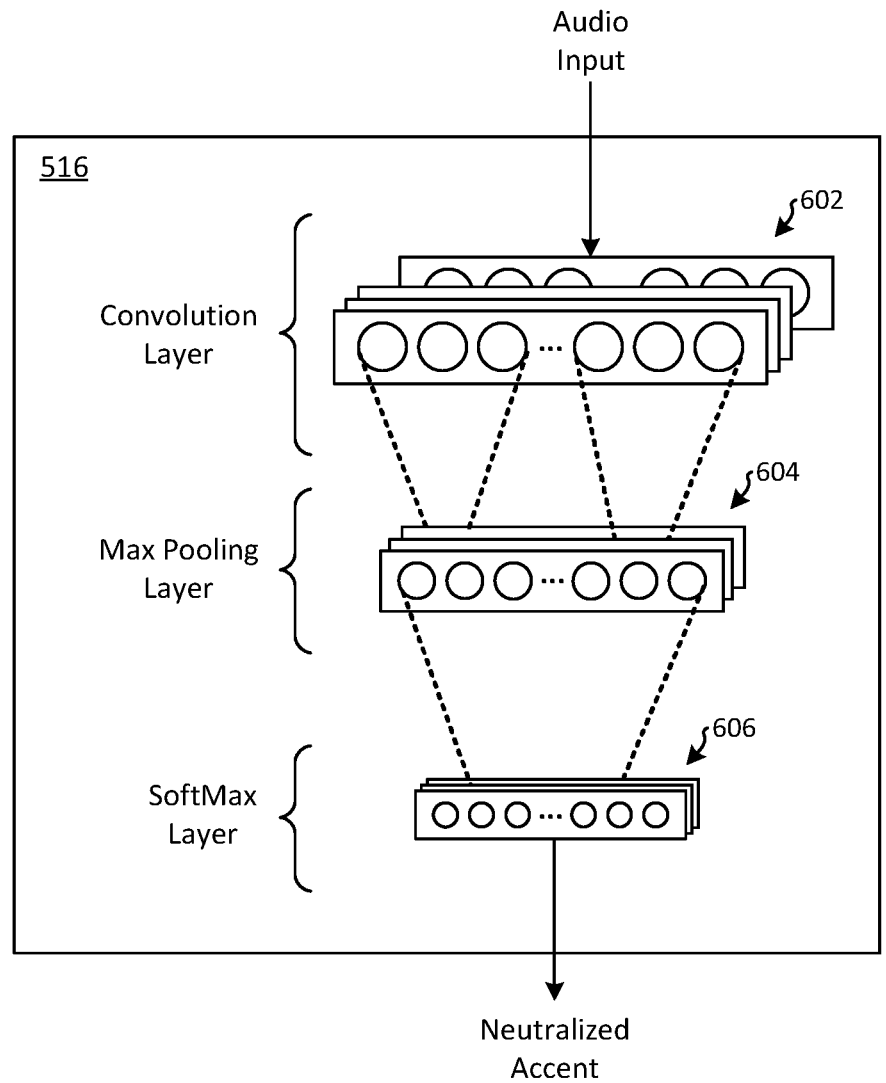
FIG. 6 is a diagram showing illustrative components of the accent classification module of the system of FIG. 5, in accordance with an embodiment of the present disclosure.

Referring now to FIG. 6, shown is a diagram of illustrative components of accent classification module 516 of FIG. 5, in accordance with an embodiment of the present disclosure. As shown in FIG. 6, accent classification module 516 includes a convolution layer 602, a max pooling layer 604, and a softmax layer 606. In operation, convolution layer 602 can receive as input the whole audio signal corresponding to audio data. Convolution layer 602 can extract discriminative features within the input whole signals that are useful for the classification task at hand (e.g., classifying an accent of the audio signal). Convolution layer 602 can perform convolution on the extracted discriminative features via linear filters.

By way of a simple example, consider convolution in the time direction, i.e., fix the height of the filter to be equal to the number of frequency bins and vary the width of the filter to cover different number of adjacent audio segments. In this example, let the weight vector, w, with width, $\omega$, represent a filter. As a result, the filter contains the number of filters, F, multiplied by the width, $\omega$, (i.e., F×$\omega$), number of parameters, which needs to be learned. The adjacent spectral columns (e.g., audio segments) can be denoted as follows:

$$o_i = (S*w)_i = \sum_{k,l}(S[i:i+\omega-1] \odot w)_{k,l},$$

where, $\odot$ denotes the element-wise multiplication. The activation function, h, can be applied to each $o_i$ to induce the feature map $A=(a_1, \ldots, a_{T\omega+1})$ for this filter:

$$a_i = h(o_i + b),$$

where $b \in R$ is a bias term. Rectified Linear Units (ReLU) can be chosen as the activations functions due to their computational efficiency, as follows:

$$h(x) = \max(0, x).$$

P different filters can be learned at the same time so that the network can extract complementary features and enrich the representation. Furthermore, because the time duration that yields salient features varies depending on the event categories, it has been demonstrated that using multiple resolution levels is important for the task. To account for this, Q sets of P filters can be learned, each with a different width $\omega$, for a total of Q×P filters.

Pooling layer 604 can receive the feature maps produced by convolution layer 602. Pooling layer 604 can use the max pooling function to reduce the individual feature maps to a single most dominant feature. Pooling on Q×P feature maps yields Q×P features that can be joined to form a feature vector that is input to the final softmax layer 606. This pooling strategy provides a distinct advantage in that the pooled feature vectors are of the same size, P×Q.

Softmax layer 606 can receive as input the fixed-size feature vector produced by pooling layer 604. Softmax layer 606 can compute the predicted probability over the class labels. In some implementations, the network can be trained by minimizing the cross-entropy error. Minimizing the cross-entropy error is the same as minimizing the KL-divergence between the prediction, ŷ, and target distribution, y. With the binary one hot coding scheme and the network parameter θ, the error for N training samples is as follows:

$$E(\theta) = -\frac{1}{N}\sum_{i=1}^{N} y_i \log(\hat{y}_i(\theta)) + \frac{\lambda}{2}\|\theta\|^2.$$

The trade-off between the error term and the $\ell_2$-norm regularization term can be governed by the hyper-parameter λ. In some implementations, softmax layer 606 can use dropouts for regularization by randomly setting values in the weight vector to zero with a predefined probability. The Adam gradient descent algorithm can be used for optimization.

Figure 7:
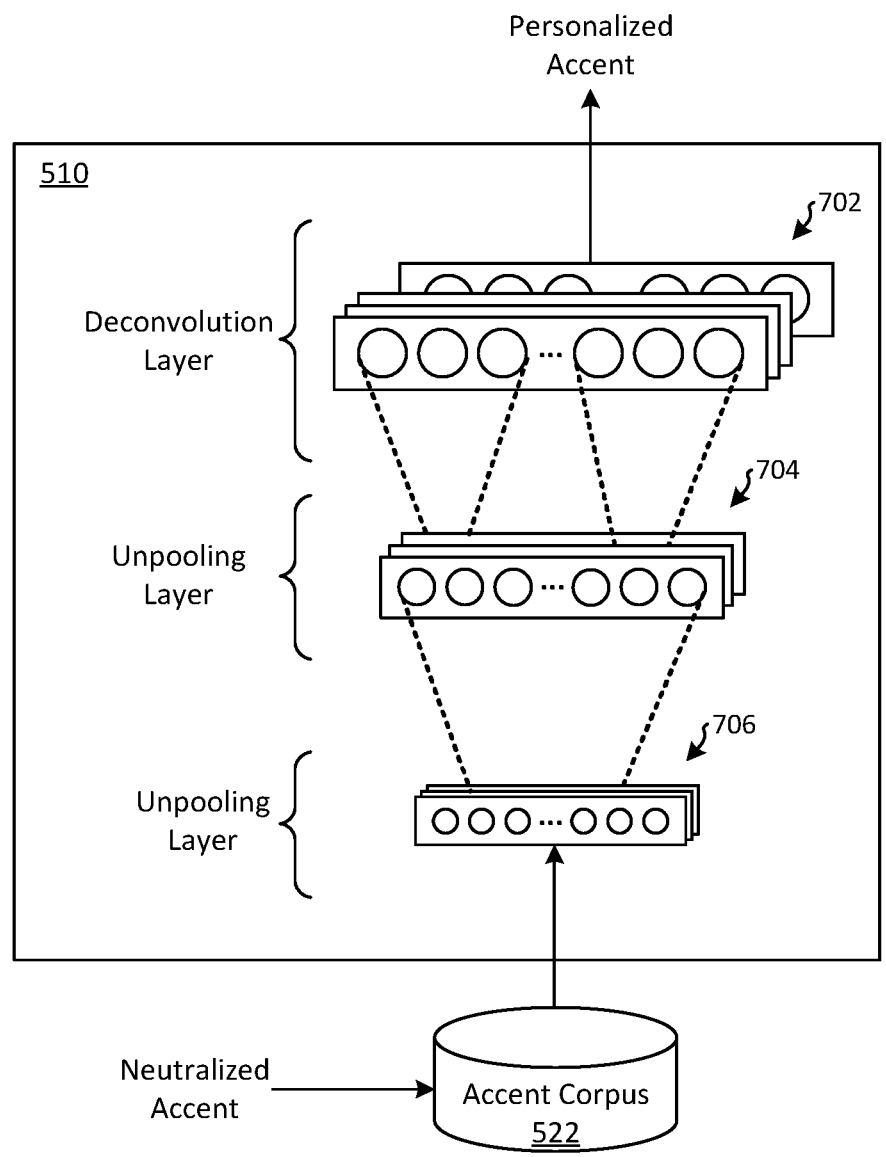
FIG. 7 is a diagram showing illustrative components of the accent personalization submodule of the system of FIG. 5, in accordance with an embodiment of the present disclosure.

Referring now to FIG. 7, shown is a diagram of illustrative components of accent personalization submodule 510 of FIG. 5, in accordance with an embodiment of the present disclosure. As shown in FIG. 7, accent personalization module 510 includes a deconvolution layer 702 and unpooling layers 704, 706. Deconvolution, which reverses the effects of convolution, can be applied to restore an input audio signal (e.g., an input speech signal) x. The restored speech signal, x̂(n), can be represent as a linear sum of feature map zk(n) convolved with filter ck(n), as follows:

$$\hat{x}(n) = \sum_{k=1}^{K} zk(n) * ck(n),$$

where K denotes the number of filters. The 1D deconvolution transforms in the opposite direction of a normal 1D convolution. The connectivity pattern of the transposed convolution operation needs to be compatible with the convolution in order to complete the transposed convolutions. Note that the deconvolution's input (e.g., input to deconvolution layer 702) is the convolution's output (e.g. output from convolution layer 602 of FIG. 6).

To reconstruct the signal with higher, and in some cases much higher, fidelity pooling operators, the maximum value from a pooling layer (e.g., pooling layer 604 of FIG. 6) can be passed to the corresponding unpooling layer (e.g., unpooling layer 704). In some implementations, hard version pooling can be used in the encoder to output the maximum value of each pooling region, and upsampling can be used in the decoder to repeat the maximum value in each unpooling region. In such implementations, a mask can be used to pass the location of the maximum value in each pooling region in the encoder to the corresponding unpooling region in the decoder. The decoder can be built by the same number of deconvolution and unpooling layers.

In some implementations, each feature map of each residual learning block (RLB) can be upsampled twice in each unpooling layer. This results in the same number of feature maps but with higher temporal resolution. The audio clip (e.g., the audio signal) can be rebuilt when the deep representation, such as, for example, a 2000-dimensional vector, is input to the decoder.

Deep residual learning enables skip connections, allowing the network to be as linear or nonlinear as the data dictates. RLBs can be composed of multiple layers and can aid in the training of deep neural networks. In an RLB, skip connections refer to connections that skip one or more layers and connect to the next available layer. To facilitate training of the designed very deep encoder-decoder, different RLBs can be used in the encoder and decoder. For example, the RLB used in the encoder can include two convolution layers, and the RLB used in the decoder can include two deconvolution layers.

Figure 8:
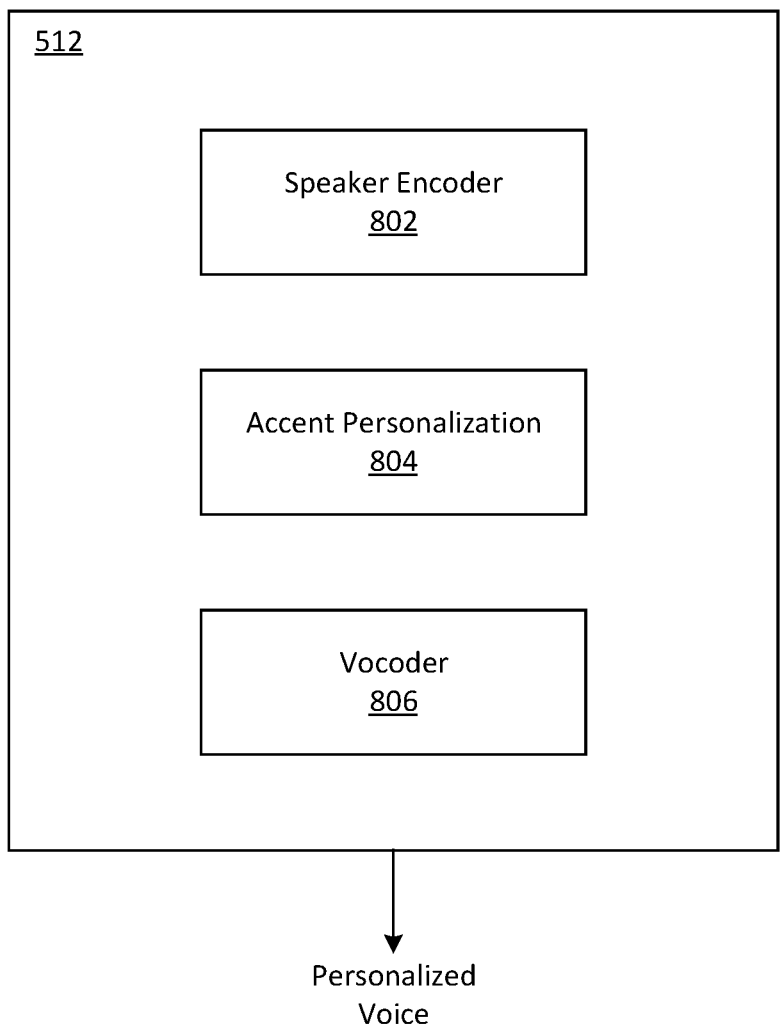
FIG. 8 is a diagram showing illustrative components of the voice personalization submodule of the system of FIG. 5, in accordance with an embodiment of the present disclosure.

Referring now to FIG. 8, shown is a diagram of illustrative components of voice personalization submodule 512 of FIG. 5, in accordance with an embodiment of the present disclosure. As shown in FIG. 8, voice personalization module 512 includes a speaker encoder 802, an accent personalization module 804, and a vocoder 806. In some embodiments, voice personalization module 512 can be implemented as a modification to a Zero-Shot Long-Form Voice Cloning with Dynamic Convolution Attention system in which the synthesizer (e.g., a text-to-speech (TTS) model that learns to convert text sequences into acoustic sequences based on the output of speaker encoder 802) of the system is replaced with accent personalization module 804.

Speaker encoder 802, accent personalization module 804, and vocoder 806 can be independently trained models. In some implementations, vocoder 806 can include the universal SC-WaveRNN vocoder. Speaker encoder 802 can compute the d-vector utterance by utterance. The computed d-vector can be used to condition the vocoder's mel-spectrogram synthesized and time-domain waveforms. In some implementations, Dynamic Convolution Attention, which enables the model to generalize to extremely long utterances, can be employed. In some implementations, other architectural changes, such as passing the speaker embedding vector through an additional linear layer to stimulate the extraction of more meaningful speaker characteristics, adding a skip connection represented by the concatenation of the first decoder long short-term memory (LSTM) output with the accent personalization, and/or predicting the next mel-spectrogram frame using the previous time step context vector, can be introduced in the accent personalization to improve the alignment process. In some implementations, the dropout with probability 0.1 can applied to the input of the dynamic convolution filters. This can be done in addition to the regularizations proposed for the original single-speaker system. In some implementations, the zone out the probability for the second decoder LSTM layer can be increased to 0.15. It is appreciated that one or more of these architectural changes can result in improved alignment consistency.

Figure 9:
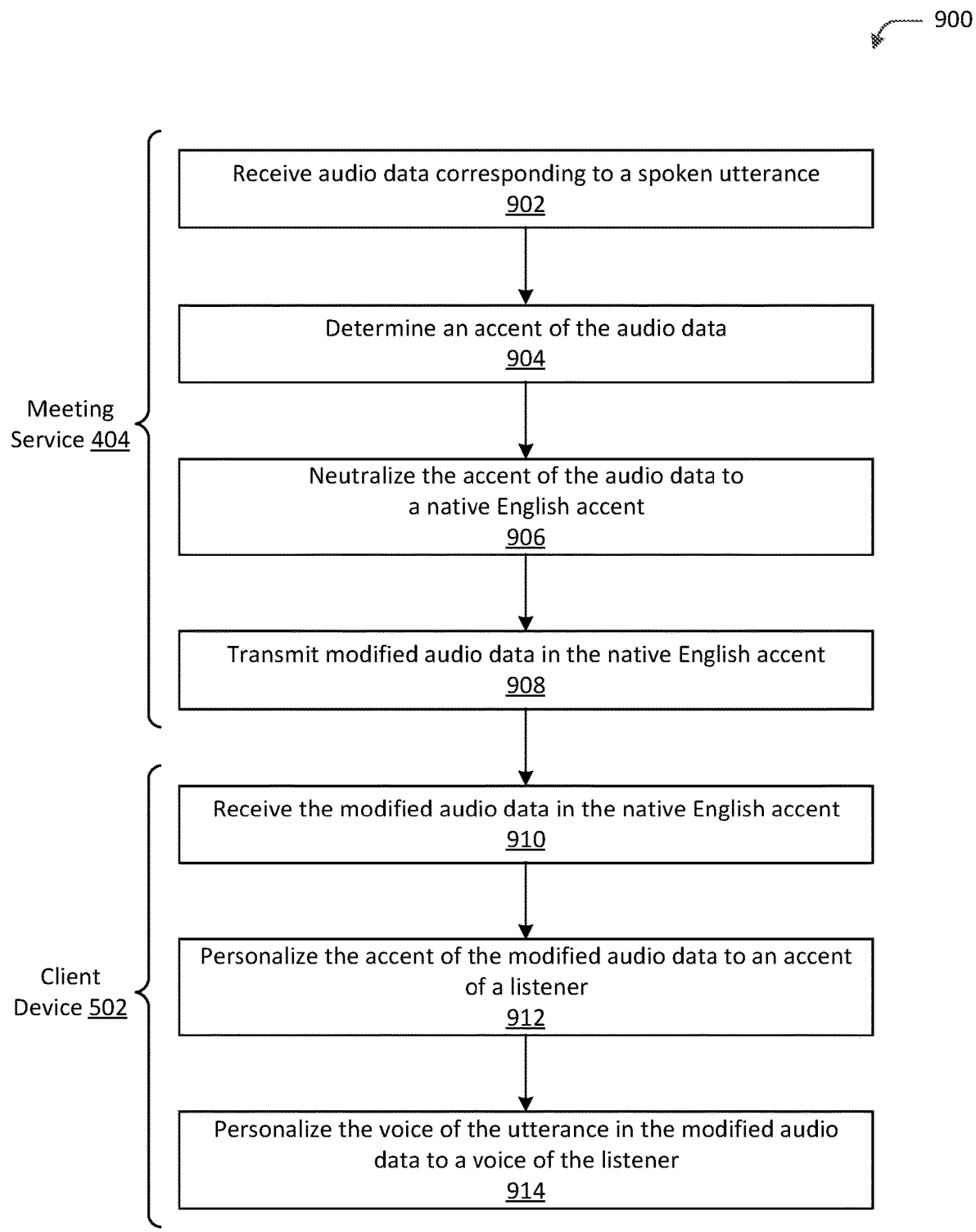
FIG. 9 is a flow diagram of an example process for accent personalization, in accordance with an embodiment of the present disclosure.

FIG. 9 is a flow diagram of an example process 900 for accent personalization, in accordance with an embodiment of the present disclosure. Illustrative process 900 may be implemented, for example, within system 500 of FIG. 5. In more detail, process 900 may be performed, for example, in whole or in part by accent personalization module 510, voice personalization module 512, accent classification module 516 and neutralizations models 520A-N, or any combination of these including other components of system 500 described with respect to FIG. 5.

With reference to process 900 of FIG. 9, at 902, audio data corresponding to a spoken utterance may be received. For example, audio data can be received from meeting client 506 on a client device 502 being used by a user to participate in an online meeting hosted by meeting service 404. The received audio data may correspond to a spoken utterance made by the user of client device 502 during the online meeting.

At 904, an accent of the audio data may be determined. For example, upon receiving the audio data, meeting service 404 can determine an accent of the spoken utterance in the audio data. In some embodiments, meeting service 404 can utilize ML models to process the audio data and determine the accent of the spoken utterance in the audio data, as previously described herein.

At 906, the accent of the audio data may be neutralized to a native English accent. For example, upon determining the accent of the spoken utterance in the audio data, meeting service 404 can neutralize the accent of the spoken utterance in the audio data to a native English accent or another preconfigured accent. In some embodiments, meeting service 404 can utilize an ML model to neutralize the accent of the spoken utterance in the audio data, as previously described herein.

At 908, modified audio data in the native English accent may be transmitted. The modified audio data includes the spoken utterance in the native English accent. For example, meeting service 404 can transmit the modified audio data in the native English accent to other computing devices 502 being used by other users to participate in the online meeting.

At 910, the modified audio data in the native English accent may be received. For example, the other computing device 502 being used by another user to participate in the online meeting can receive the modified audio data.

At 912, the accent of the modified audio data may be personalized to an accent of a listener. For example, upon receipt of the modified audio data, audio personalization module 508 on the other computing device 502 can personalize the accent of the modified audio data to an accent of the another user using the other computing device 502. Here, the another user corresponds to the listener. In some embodiments, audio personalization module 508 can utilize ML models to process the modified audio data and personalize the accent of the spoken utterance in the modified audio data to the accent of the another user, as previously described herein. The other client device 502 can then output the modified audio data personalized with the accent of the another user via a connected loudspeaker so that the another user can hear the spoken utterance in their accent, for example.

At 914, the voice of the utterance in the modified audio data may be personalized to a voice of the listener. For example, upon receipt of the modified audio data, audio personalization module 508 on the other computing device 502 can personalize a voice of the spoken utterance in the modified audio data to a voice of the another user using the other computing device 502. Here, the another user corresponds to the listener. In some embodiments, audio personalization module 508 can utilize ML models to process the modified audio data and personalize the voice of the spoken utterance in the modified audio data to the voice of the another user, as previously described herein. The other client device 502 can then output the modified audio data with the voice of the spoken utterance personalized to the voice of the another user via a connected loudspeaker so that the another user can hear the utterance spoken in their voice, for example.

In some embodiments, upon receipt of the modified audio data, audio personalization module 508 computing device 502 can personalize the accent of the modified audio data and personalize a voice of the spoken utterance in the modified audio data. The accent of the modified audio data may be personalized to an accent of a user of computing device 502. Similarly, the voice of the spoken utterance in the modified audio data may be personalized to a voice of the user of computing device 502.

In the foregoing detailed description, various features of embodiments are grouped together for the purpose of streamlining the disclosure. This method of disclosure is not to be interpreted as reflecting an intention that the claims require more features than are expressly recited. Rather, inventive aspects may lie in less than all features of each disclosed embodiment.

As will be further appreciated in light of this disclosure, with respect to the processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

Elements of different embodiments described herein may be combined to form other embodiments not specifically set forth above. Other embodiments not specifically described herein are also within the scope of the following claims.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the words "exemplary" and "illustrative" are used herein to mean serving as an example, instance, or illustration. Any aspect or design described herein as "exemplary" or "illustrative" is not necessarily to be construed as preferred or advantageous over other aspects or designs. Rather, use of the words "exemplary" and "illustrative" is intended to present concepts in a concrete fashion.

In the description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical examples to aid the reader in understanding the present disclosure, and are to be construed as being without limitation to such specifically recited examples and conditions. Although illustrative embodiments of the present disclosure have been described in detail, various changes, substitutions, and alterations could be made hereto without departing from the scope of the present disclosure. Accordingly, it is intended that the scope of the present disclosure be limited not by this detailed description, but rather by the claims appended hereto.

What is claimed is:

1. A method comprising:
providing a service on a computing device and an application on another computing device;
receiving, by a computing device, audio data corresponding to a spoken utterance by a first user;
determining, by the computing device, an accent of the audio data using an accent classification module, the accent classification module comprising a convolution layer, a maximum pooling layer, and a softmax layer;
selecting a neutralization model from a plurality of models, each of the plurality of models trained to neutralize a different accent;
neutralizing, by the computing device, the accent of the audio data to generate a modified audio data in a preconfigured accent using the selected neutralization model;
transmitting, by the computing device, the modified audio data in the preconfigured accent to the another computing device being used by a second user;
personalizing, by the application, the modified audio data to a first accent selected by the second user;
personalizing, by the application, the voice of the spoken utterance to a second voice selected by the second user; and
outputting, by the application, the cloned voice to an audio playback device.

2. The method of claim 1, wherein the preconfigured accent is a native English accent.

3. The method of claim 1, wherein the accent of the audio data is a non-native English accent.

4. The method of claim 1, wherein the accent of the audio data is a native English accent.

5. The method of claim 1, wherein the accent of the second user is a native English accent.

6. The method of claim 1, wherein the accent of the second user is a non-native English accent.

7. The method of claim 1, further comprising:
wherein the second voice is selected to be one of a voice of the first user and a voice of the second user.

8. The method of claim 7, wherein the second voice is a cloning of the voice of the second user.

9. A computing device comprising:
one or more non-transitory machine-readable mediums configured to store instructions; and
one or more processors configured to execute the instructions stored on the one or more non-transitory machine-readable mediums, wherein execution of the instructions causes the one or more processors to carry out a process comprising:
providing a service on a computing device and an application on another computing device;
receiving audio data corresponding to a spoken utterance by a first user;
determining, by the computing device, an accent of the audio data using an accent classification module, the accent classification module comprising a convolution layer, a maximum pooling layer, and a softmax layer;
selecting a neutralization model from a plurality of models, each of the plurality of models trained to neutralize a different accent;

neutralizing, by the computing device, the accent of the audio data to generate a modified audio data in a preconfigured accent using the selected neutralization model;

transmitting, by the computing device, the modified audio data in the preconfigured accent to the another computing device being used by a second user personalizing, by the application, the modified audio data to a first accent selected by the second user;

personalizing, by the application, the voice of the spoken utterance to a second voice selected by the second user; and outputting, by the application, the cloned voice to an audio playback device.

10. The computing device of claim 9, wherein the preconfigured accent is a native English accent.

11. The computing device of claim 9, wherein the accent of the audio data is a non-native English accent.

12. The computing device of claim 9, wherein the accent of the audio data is a native English accent.

13. The computing device of claim 9, wherein the accent of the second user is a native English accent.

14. The computing device of claim 9, wherein the accent of the second user is a non-native English accent.

15. The computing device of claim 9, wherein the second voice is selected to be one of a voice of the first user and a voice of the second user.

16. The computing device of claim 15, wherein the second voice is a cloning of the voice of the second user.

17. The computing device of claim 15, wherein the another voice is a voice specified by the second user.

18. A non-transitory machine-readable medium encoding instructions that when executed by one or more processors cause a process to be carried out, the process including:

providing a service on a computing device and an application on another computing device;

receiving audio data corresponding to a spoken utterance by a first user;

determining an accent of the audio data using an accent classification module, the accent classification module comprising a convolution layer, a maximum pooling layer, and a softmax layer;

selecting a neutralization model from a plurality of models, each of the plurality of models trained to neutralize a different accent;

neutralizing the accent of the audio data to generate a modified audio data in a preconfigured accent using the selected neutralization model;

transmitting the modified audio data in the preconfigured accent to the another computing device being used by a second user;

personalizing the modified audio data to a first accent selected by the second user;

personalizing the voice of the spoken utterance to a second voice selected by the second user; and outputting the cloned voice to an audio playback device.

* * * * *